E. R. DAHLSTRÖM.
SELF CLOSING SCREW CUTTING TAP.
APPLICATION FILED AUG. 23, 1920.
1,432,018.
Patented Oct. 17, 1922.
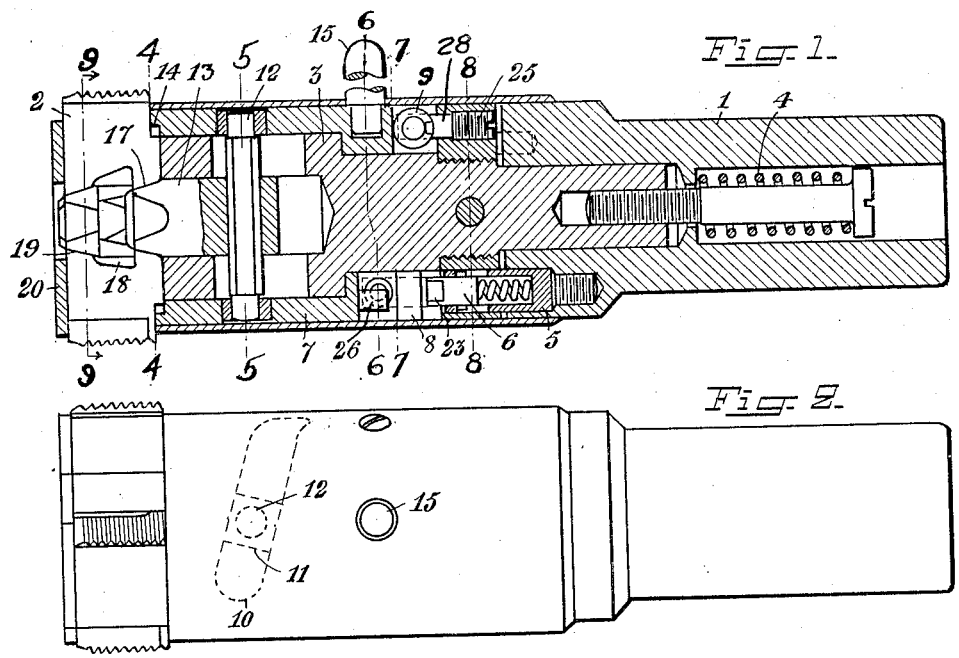
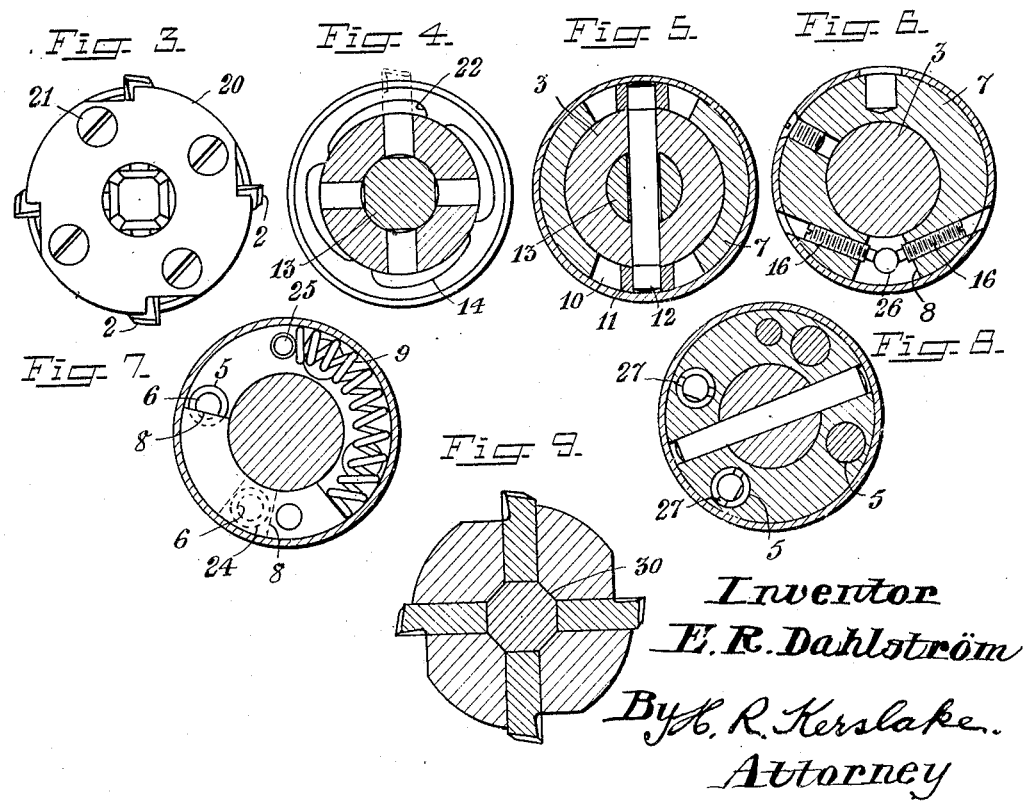
Inventor
E. R. Dahlström
By H. R. Kerslake
Attorney Patented Oct. 17, 1922.

1,432,018

UNITED STATES PATENT OFFICE.

ERNST RUBEN DAHLSTRÖM, OF STOCKHOLM, SWEDEN, ASSIGNOR TO AKTIEBOLAGET FORMATOR, OF STOCKHOLM, SWEDEN, A CORPORATION.

SELF-CLOSING SCREW-CUTTING TAP.

Application filed August 23, 1920. Serial No. 405,430.

*To all whom it may concern:*

Be it known that I, ERNST RUBEN DAHLSTRÖM, engineer, subject of the King of Sweden, residing at Fridhemsgatan 40 C, Stockholm, Sweden, have invented certain new and useful Improvements in Self-Closing Screw-Cutting Taps, of which the following is a specification.

The present invention relates to screw cutting taps of the type wherein the cutting dies are automatically collapsible, the same during the cutting operation bearing against a central spindle adapted to be displaced in the longitudinal direction of the tap, the fore end of the said spindle being provided with two supporting surfaces, or with two series of such surfaces, situated in front of each other, the said surfaces being beveled on the outside and separated by a slot or a series of slots in the spindle which is displaced on the completion of the cutting operation in such manner that the support of the cutting dies is withdrawn, the latter then falling back into the said slots so as to be retracted from the engagement with the threads, whereby the screw cutting tap is set free so that it may be withdrawn from the work piece.

The invention is principally characterized by this that the part of the spindle which is provided with the interior supporting surfaces is also guided in the die holder alongside the surfaces of the spindle against which the dies are abutting.

Hereby the employment of a separate guiding stud projecting from the end of the spindle and extending through the front end wall of the casing is avoided, such an arrangement, on the other hand, being necessary in the constructions as heretofore known, in order to obtain the proper guidance.

An embodiment of a screw cutting tap according to the invention is shown by way of example in the accompanying drawing, in which:—

Fig. 1 illustrates the screw cutting tap in longitudinal section, whereas Fig. 2 is an elevation of the tap. Fig. 3 is an end view of the screw cutting tap, looking from the front end thereof, and Figs. 4–9 are cross sections on lines 4—4, 5—5, 6—6, 7—7, 8—8 and 9—9 respectively in Fig. 1.

1 designates the pipe-shaped shaft of the screw cutting tap, the said shaft being attached to the tool holder, and 2 denotes the dies which are movable in radial slots in the front portion of the die holder or the inner frame 3. The rear end of the die holder enters the central bore of the shaft 1, and screwed into the die holder is a screw between the head of which and an internal abutment on the shaft is inserted a helical spring 4. The dies are arranged in a group around a central spindle 13 which is slidable in a bore in the fore end of the die holder 3, the spindle 13 having also a transversal stud 12 extending therethrough, the ends of the said stud 12 being provided with square-heads (see Fig. 2) each engaging into a screw-shaped slot 10 in the adjusting sleeve 7 surrounding the die holder.

The screw cutting tap is attached with the shaft 1 into the tool holder and is then brought into operative position relatively to the work piece, after which the cutting operation is started.

The dies then occupy the position shown in Fig. 1 in which the projections 17 and 19 of the dies which are directed inwardly toward the centre of the tap bear against oblique circumferential supporting surfaces in two abutments in the spindle 13, which abutments are situated in front of or back of the slot or the recesses 18 in the spindle so as to be separated by the said slot 18.

It is not only the part of the spindle provided with the rear supporting surfaces which is being guided in the die holder 3 laterally of the surfaces of the spindle serving as supporting surfaces for the dies (see Fig. 4), this being the case also with respect to that part of the spindle which is provided with the front surfaces bearing against the projections 19 of the dies, the latter portion of the spindle being guided laterally of the contact surfaces between the dies and the spindle as shown in Fig. 3, and more clearly at 30 in Fig. 9.

The work piece having been threaded as far as desired the forward movement of the screw cutting tap is interrupted by means of a suitable stopping device against which the tool holder strikes. The work piece, which is continually rotating, compels the dies and thus the die holder with the parts pertaining thereto to move forwards with respect to the shaft 1, whereby the spring 4 is being strained. The studs 5, which are screwed each into a bore in the shaft and engage each into a bore in a ring screwed onto the frame (see cross section of Fig. 8), prevent a relative rotation between the die holder and the shaft. All or some of the studs 5 (according to the drawing two) are provided with a longitudinal central bore having slidably inserted therein a spring-actuated pawl 6, one side of which is provided with a bevelled portion 23. The adjusting sleeve 7 is provided with an abutment 8 for each of the bevelled portions of the said pawls. Inserted between an abutment 28 in the adjusting sleeve and a screw 25 connected with the die holder 3 (see Figs. 1 and 7) is a helical spring 9 tending to rotate the adjusting sleeve in one direction with respect to the die holder.

When the one pawl 6 with its bevelled portion 23 abuts against its abutment 8 in the adjusting sleeve, such condition corresponds to a certain working position of the dies, for instance the position for coarse cutting, and when the other pawl 6 with its bevelled portion 23 bears against the abutment 8, the dies occupy another working position, for instance that of finishing. The adjustment into one or the other of the positions during the operation of the screw cutting tap may be easily effected by means of the handle 15 of the adjusting sleeve, the engagements of the different pawls 5 and 6 then making themselves known by a loud click.

When, after the cutting has been completed, the longitudinal displacement of the die holder 3 with respect to the shaft has been extended so far that the pawl 6 is no longer supported by its abutment 8, the adjusting sleeve 7 is rotated relatively to the die holder by the action of the spring 9, the spindle 13 being then moved back so far through the medium of the oblique slots 10, the square sliding pieces 11 and the stud 12 that the projections 17 of the dies are brought to register with the recesses of the slots 18 in the spindle 13. During this rotary movement the cams 14 of the adjusting sleeve slide against the abutments 22 of the dies (Fig. 4), the dies thus being displaced inwardly toward the centre of the tap so that they fall into the recesses 18 in the spindle 13 with their projections 17.

The dies now occupy their inoperative inner position, that is to say the threads thereof have been brought out of engagement with the threads of the work piece. The screw cutting tap is then withdrawn from the threaded hole and adjusted into the proper position for a new cutting operation which is effected by rotating the adjusting sleeve 7 by means of the handle 15 in the opposite direction until one of the pawls 6 is again caused to protrude and thus to lock the adjusting sleeve 7 in the starting position. This readjustment of the dies into the working position can also be effected automatically by means of a suitable arrangement in the machine tool.

The sliding pieces 11 attached to the ends of the stud 12 and engaging with the oblique slots 10 bear against the edges of the slots by surfaces which are parallel to the said edges.

The portions of the transversal stud which are situated in the die holder 3 (see Figs. 1 and 5) bear against the die holder by plane bevelled surfaces.

The object of the two latter arrangements is to provide large contact surfaces for the transversal stud 12, when rotating the adjusting sleeve, at the ends of the studs projecting into the oblique slots in the adjusting sleeve, as well as in the portions of the stud which are situated in and operate against the die holder.

27 denotes projections on the pawls engaging into longitudinal slots in the sleeve-shaped screws 5 and serving to limit the movement of the pawls in the longitudinal direction of the screws.

20 designates a plate bearing against the front of the dies, the said plate being attached to the die holder 3 by means of screws 21.

By adjusting the screws 16 which are screwed into the adjusting sleeve 7 and bear against opposite sides of a stud 26 attached into the die holder 3, the diameter may also be adjusted if for instance the dies become worn or, if by any other reason another diameter is desired in the screw cutting tap.

What I claim as new and desire to secure by Letters Patent of the United States is:—

1. A screw cutting tap including a shank, a die holder associated therewith, dies arranged radially in the holder, a central supporting spindle mounted for sliding and oscillatory movement in the holder, cooperative means on the dies and on the spindle for effecting an extension and permitting retraction of the dies upon corresponding operation of the spindle, an adjustable sleeve mounted on the die holder for oscillatory movement and having opposed spiral slots therein, a stud traversing the spindle, bearings on the ends of the stud operating in the slots whereby when the sleeve is oscillated the spindle will move therewith to extend the dies and resilient means between the sleeve and die holder for returning the dies to inactive position.

2. A screw cutting tap including a shank, a die holder associated therewith, radially disposed dies in the holder having spaced supporting surfaces projecting from the inner edges thereof, a central spindle mounted for longitudinal sliding and oscillatory movement in the holder and having alternately arranged supporting surfaces and slots for coacting with the surfaces on the dies, an adjusting sleeve mounted on the holder for oscillatory movement and having opposed spiral slots therein, a transverse stud associated with the inner portion of the spindle, bearings on the ends of the stud and operating in the spiral slots whereby when the sleeve is oscillated the spindle will move therewith to extend the dies, substantially as described and for the purpose set forth.

3. A device as claimed in claim 2 wherein coactive means is provided for setting the dies and for returning them to inactive position subsequent to the thread cutting operation.

4. A device as claimed in claim 2 whereby means is provided for setting the dies and returning them to inactive position including a ring on the die holder, pawls yieldably mounted in the ring, a block disposed between the ring and the sleeve and provided with means for coacting with the pawls, and a coiled spring connected to the block and the sleeve substantially as described.

In testimony whereof I affix my signature in presence of two witnesses.

ERNST RUBEN DAHLSTRÖM.

Witnesses:
BIGER GRIENOS,
LINUDO MOLIN.